United States Patent
Ota

(10) Patent No.: US 8,547,213 B2
(45) Date of Patent: Oct. 1, 2013

(54) REMOTE CONTROL SYSTEM AND REMOTE CONTROL METHOD

(75) Inventor: Yuya Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1653 days.

(21) Appl. No.: 11/762,439

(22) Filed: Jun. 13, 2007

(65) Prior Publication Data

US 2007/0293190 A1    Dec. 20, 2007

(30) Foreign Application Priority Data

Jun. 14, 2006 (JP) ................................ 2006-165362

(51) Int. Cl.
*B60C 1/00* (2006.01)

(52) U.S. Cl.
USPC ........... 340/435; 348/114; 348/135; 348/140; 340/539.1; 340/426.13; 340/426.14; 455/404.2

(58) Field of Classification Search
USPC .............. 348/114, 135, 140; 340/435, 539.1, 340/426.13, 426.14; 455/404.2
See application file for complete search history.

(56) References Cited

U.S. PATENT DOCUMENTS

| | | | | |
|---|---|---|---|---|
| 4,329,033 A | * | 5/1982 | Masunaga et al. | 396/103 |
| 5,805,201 A | * | 9/1998 | Fujiwara | 348/818 |
| 6,563,430 B1 | * | 5/2003 | Kemink et al. | 340/8.1 |
| 6,744,364 B2 | * | 6/2004 | Wathen | 340/539.1 |
| 6,753,790 B2 | * | 6/2004 | Davies et al. | 340/12.3 |
| 7,071,990 B2 | * | 7/2006 | Kondo | 348/383 |
| 7,158,117 B2 | * | 1/2007 | Sato et al. | 345/158 |
| 7,379,078 B1 | * | 5/2008 | Gossweiler et al. | 345/660 |
| 7,394,450 B2 | * | 7/2008 | Shibamiya et al. | 345/156 |
| 7,440,036 B2 | * | 10/2008 | Onomatsu et al. | 348/581 |
| 2003/0080875 A1 | * | 5/2003 | Wathen | 340/825.72 |
| 2004/0230904 A1 | * | 11/2004 | Tada | 715/517 |
| 2004/0239620 A1 | * | 12/2004 | Numano | 345/156 |
| 2004/0257337 A1 | * | 12/2004 | Shibamiya et al. | 345/156 |
| 2005/0253807 A1 | * | 11/2005 | Hohmann et al. | 345/156 |
| 2007/0080939 A1 | * | 4/2007 | Isozu | 345/158 |
| 2007/0080940 A1 | * | 4/2007 | Aoki et al. | 345/158 |
| 2008/0052624 A1 | * | 2/2008 | Roberts et al. | 715/716 |

FOREIGN PATENT DOCUMENTS

| | | |
|---|---|---|
| JP | 2000-152109 | 5/2000 |
| JP | 2004-096599 | 3/2004 |
| JP | 2004-336439 A | 11/2004 |

OTHER PUBLICATIONS

The above reference was cited in a Mar. 25, 2011 Japanese Office Action, which is enclosed without English Translation, that issued in Japanese Patent Application No. 2006-165362.

* cited by examiner

*Primary Examiner* — Dohm Chankong
(74) *Attorney, Agent, or Firm* — Cowan, Liebowitz & Latman, P.C.

(57) ABSTRACT

There is provided a remote control system which changes the functions corresponding to a specific operation unit provided for a controlling apparatus in accordance with distance, thereby improving the convenience for a user. The remote control system includes a controlled apparatus such as a TV set and a controlling apparatus such as a remote controller which remotely controls the controlled apparatus. A measuring unit measures the distance between the controlled apparatus and the controlling apparatus. A changing unit changes the functions to be executed when a specific one of a plurality of operation units provided for the controlling apparatus is operated, in accordance with the measured distance.

12 Claims, 16 Drawing Sheets

207

| DISTANCE CONDITION | CONTENTS OF EXECUTABLE CONTROL |
|---|---|
| DISTANCE ≦ L1 | INITIAL SETTING, CHANGING OF PASSWORD, AND THE LIKE |
| L1 < DISTANCE ≦ L2 | IMAGE QUALITY ADJUSTMENT, SUBSCRIPTION TO VOD SERVICE, AND THE LIKE |
| L2 < DISTANCE | TV VIEWING OPERATION, RECORDING, AND PLAYBACK |

FIG. 7

| DISTANCE CONDITION | CONTENTS OF EXECUTABLE CONTROL |
|---|---|
| DISTANCE ≦ L1 | INITIAL SETTING, CHANGING OF PASSWORD, AND THE LIKE |
| L1 < DISTANCE ≦ L2 | IMAGE QUALITY ADJUSTMENT, SUBSCRIPTION TO VOD SERVICE, AND THE LIKE |
| L2 < DISTANCE | TV VIEWING OPERATION, RECORDING, AND PLAYBACK |

207

REMOTE CONTROL SYSTEM AND REMOTE CONTROL METHOD

BACKGROUND OF THE INVENTION

1. Field of the Invention

The present invention relates to a technique of remotely controlling a controlled apparatus in accordance with the distance between a controlling apparatus and the controlled apparatus.

2. Description of the Related Art

Recently, controlling apparatuses typified by remote controllers have started to allow various remote manipulations with respect to controlled apparatuses. With regard to a digital TV set, a remote controller allows the user to perform operations, for example, initial setting, recording, playback, charging, authentication, Web browsing, and the transmission/reception of electronic mail, in addition to general TV viewing operation.

The application of a ranging technique to home appliances has been proposed. Japanese Patent Laid-Open No. 2000-152 has proposed an invention designed to provide a ranging function for a TV receiver and warn a viewing audience not to move closer to the TV receiver when the distance between the viewing audience and the TV receiver becomes too short. In addition, Japanese Patent Laid-Open No. 2004-096599 has proposed a remote control system which entirely invalidates operation by a remote controller if the distance to a viewing audience is shorter than a predetermined distance, and entirely validates operation by the remote controller if the distance is longer than the predetermined distance. This aims at preventing children and the like from developing myopia or epilepsy.

Recently, providing multiple functions to a remote controller has caused various problems. A digital TV set allows the user to subscribe to a VOD (Video On Demand) service and change various passwords through a remote controller. If, therefore, a child or the like mischievously operates the remote controller and unintentionally subscribes to a pay service or changes a password, the subscriber will suffer a financial loss.

The inventions disclosed in patent references 1 and 2, however, can only prevent a viewing audience from moving closer to the TV receiver. The invention disclosed in patent reference 2, in particular, is only configured to entirely inhibit the operation of the remote controller or entirely permit the operation in accordance with whether the distance is short or long.

It is convenient if the user can change the contents of operation which he/she can perform through a remote controller in accordance with the distance between a controlled apparatus and a controlling apparatus. It is also convenient if the contents of processing to be executed in a controlled apparatus change in accordance with the distance to the apparatus at the time of operation even when the user operates the same button.

Consider an enlargement/reduction button for a TV screen. For example, when the user presses this button from a place far from the TV set, the enlargement ratio is set to 200%. When the user presses the button from a place close to the TV set, the enlargement ratio is set to 120%. In this case, the merit of this technique is that operating the remote controller at a long distance can greatly enlarge the screen at once, and operating the remote controller at a short distance can gradually enlarge the screen.

SUMMARY OF THE INVENTION

The present invention therefore provides a remote control system which can change the contents of control corresponding to a specific operation unit in accordance with distance.

The present invention is suitably implemented by a remote control system which includes a controlled apparatus and a controlling apparatus which remotely controls functions of the controlled apparatus. A measuring unit measures the distance between the controlled apparatus and the controlling apparatus. The changing unit changes the functions to be executed when a specific one of a plurality of operation units provided for a controlling apparatus which is operated, in accordance with the measured distance.

Further features of the present invention will become apparent from the following description of exemplary embodiments with reference to the attached drawings.

BRIEF DESCRIPTION OF THE DRAWINGS

FIG. 7 is a view showing an example of a management table according to the embodiment;

DESCRIPTION OF THE EMBODIMENTS

An embodiment of the present invention will be described below. Obviously, each embodiment to be described below will help to understand the higher, intermediate, and lower concepts of the present invention. The technical range of the present invention is defined by claims, but is not limited by each embodiment to be described below.

First Embodiment

This embodiment relates to a case wherein the controlled apparatus is a digital TV set, and the controlling apparatus is a remote controller. Assume that in the first embodiment, the digital TV set as the controlled apparatus executes main processing for changing the functions, e.g. contents of control, in accordance with distance. As will be described later, the controlling apparatus may execute the main processing or the controlling apparatus and the controlled apparatus may execute it in cooperation with each other.

Figure 1:
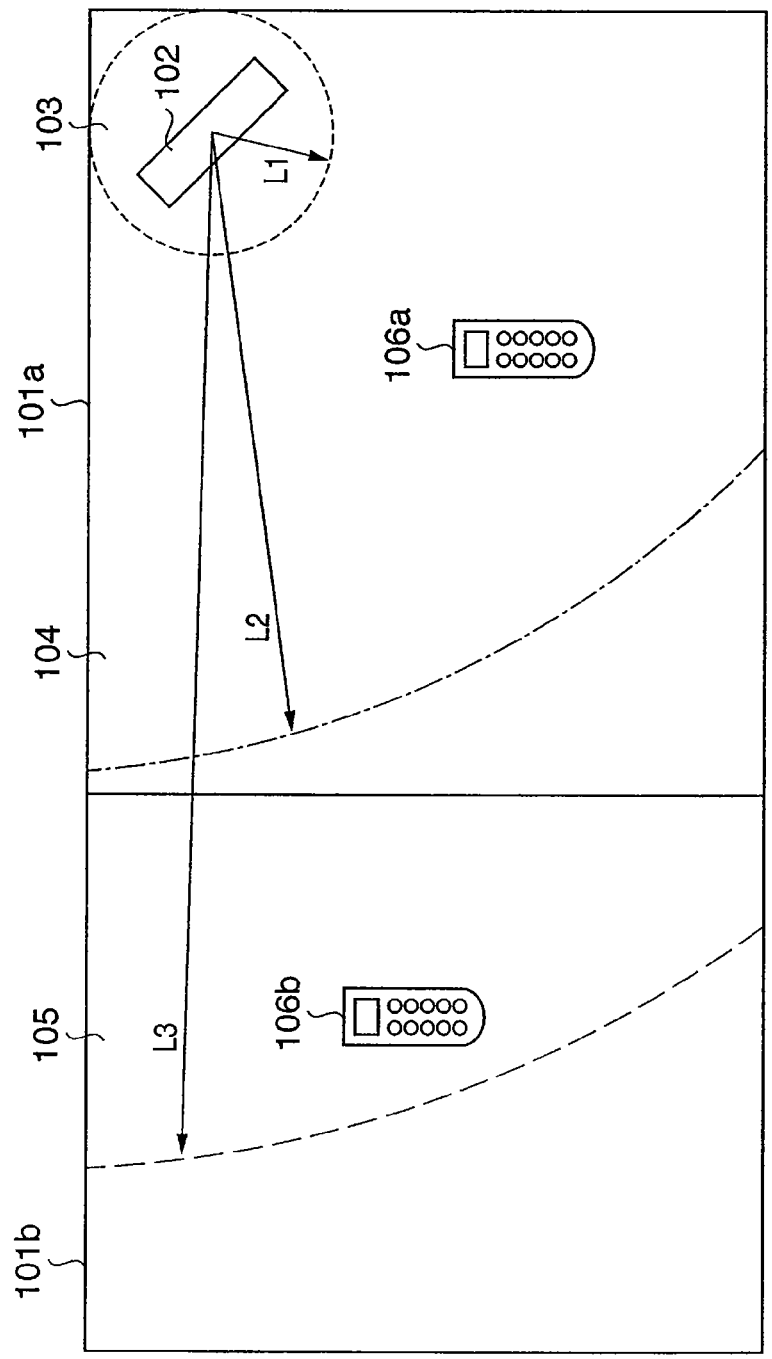
FIG. 1 is a view for explaining a remote control system according to an embodiment.

FIG. 1 is a view for explaining a remote control system according to the embodiment. FIG. 1 shows two rooms 101a and 101b. A digital TV set 102 as an example of the controlled apparatus is placed on the upper right corner of the room 101a. A user can remotely control the digital TV set 102 through remote controllers 106a and 106b (to be referred to as remote controllers 106 hereinafter). The digital TV set 102 is a TV receiver which can receive and display digital signal broadcast waves such as terrestrial digital broadcasts. A display panel is generally implemented by a liquid crystal system, plasma system, rear projection system, an SED system, or the like.

The digital TV set 102 has various functions in addition to a general TV viewing function. These functions include, for example, various setting functions for initial setting, image quality adjustment, and the like, video data recording/playback function, various authentication and charging functions for VOD and the like, a Web browser function, an electronic mail read/write function, and a program search function using EPG. The user can remotely manipulate and control these functions through the remote controller 106.

The digital TV set 102 may also include a wireless communication unit which complies with the UWB specifications and can perform high-speed wireless communication in a short range. This allows the digital TV set 102 to communicate, with an external recording apparatus, data for recording/playback of broadcast waves, communicate with a digital camera to display still images stored in it, and communicate with a digital video camera to receive and display video data.

In addition, the wireless communication unit complying with the UWB specifications has a distance measuring (ranging) function. It is said that this ranging function can theoretically achieve a ranging accuracy of several ten cm. Note that UWB allows communication within a relatively narrow range as compared with wireless LAN specifications such as IEEE802.11a/b/g, but allows communication at higher speed. Therefore, UWB helps to replace the wired connection between apparatuses in a home with cableless connection.

Referring to FIG. 1, three areas are provided in accordance with the distances from the digital TV set 102. An area 103 is an area where the distance from the center of the digital TV set 102 is less than or equal to L1. An area 104 is an area where the distance from the digital TV set 102 is more than L1 and less than or equal to L2. An area 105 is an area where the distance from the digital TV set 102 is more than L2 and less than or equal to L3. For example, L1 is 0.5 m, L2 is 3 m, and L3 is the maximum communication distance.

Figure 2:
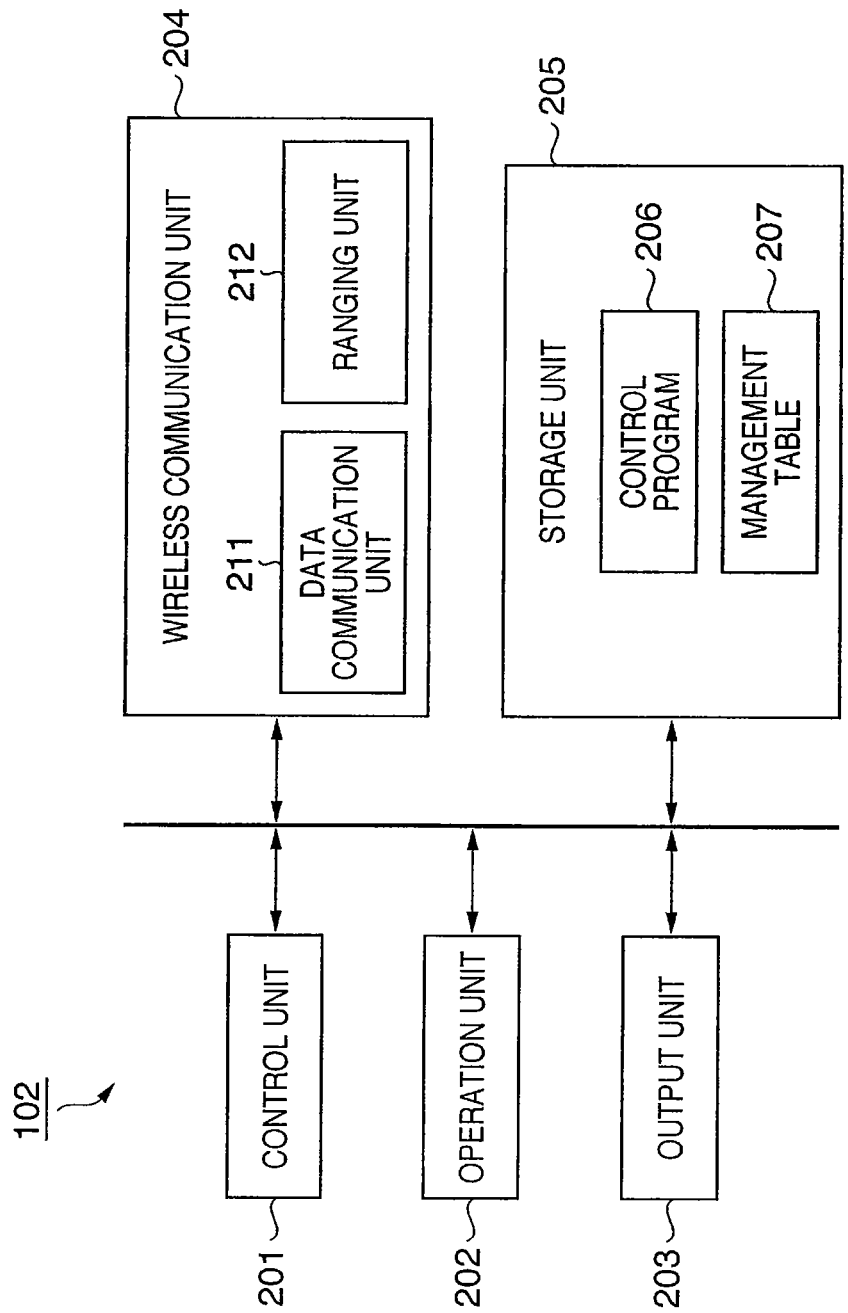
FIG. 2 is an exemplary block diagram of a controlled apparatus according to the embodiment.

FIG. 2 is a block diagram exemplifying a controlled apparatus according to the embodiment. A controlled apparatus such as the digital TV set 102 comprises the following constituent elements. A control unit 201 is a CPU or MPU which comprehensively controls the respective units included in the digital TV set 102. The control unit 201, in particular, changes the contents of control to be executed in a controlled apparatus when the user operates a specific one of a plurality of operation units provided for the controlling apparatus, in accordance with the measured distance. Note that the control unit 201 may change the contents of control by using information associated with distance (e.g., distance, speed, acceleration, direction, or coordinate position).

An operation unit 202 includes switches, buttons, and the like provided for the main body of the digital TV set 102. An output unit 203 is, for example, a display panel, video processing circuit, LED, speaker, or voice circuit. A wireless communication unit 204 is a unit for communicating with another wireless communication apparatus or the remote controller 106. The wireless communication unit 204 comprises a data communication unit 211 and a ranging unit 212. The data communication unit 211 is, for example, a unit for communicating moving image data and still image data with another wireless communication apparatus. The ranging unit 212 is a unit for measuring the distance between the controlled apparatus and the controlling apparatus.

A storage unit 205 is a storage device such as a ROM or RAM. The storage unit 205 may store a control program 206 and management table 207 for the control of the digital TV set 102. The relationship between the contents of control permitted from the remote controller 106 and distance conditions for permission is registered in the management table 207. For example, if the distance is greater than or equal to 0 and less than or equal to L1, the user is permitted to operate all functions from the remote controller 106.

Figure 3:
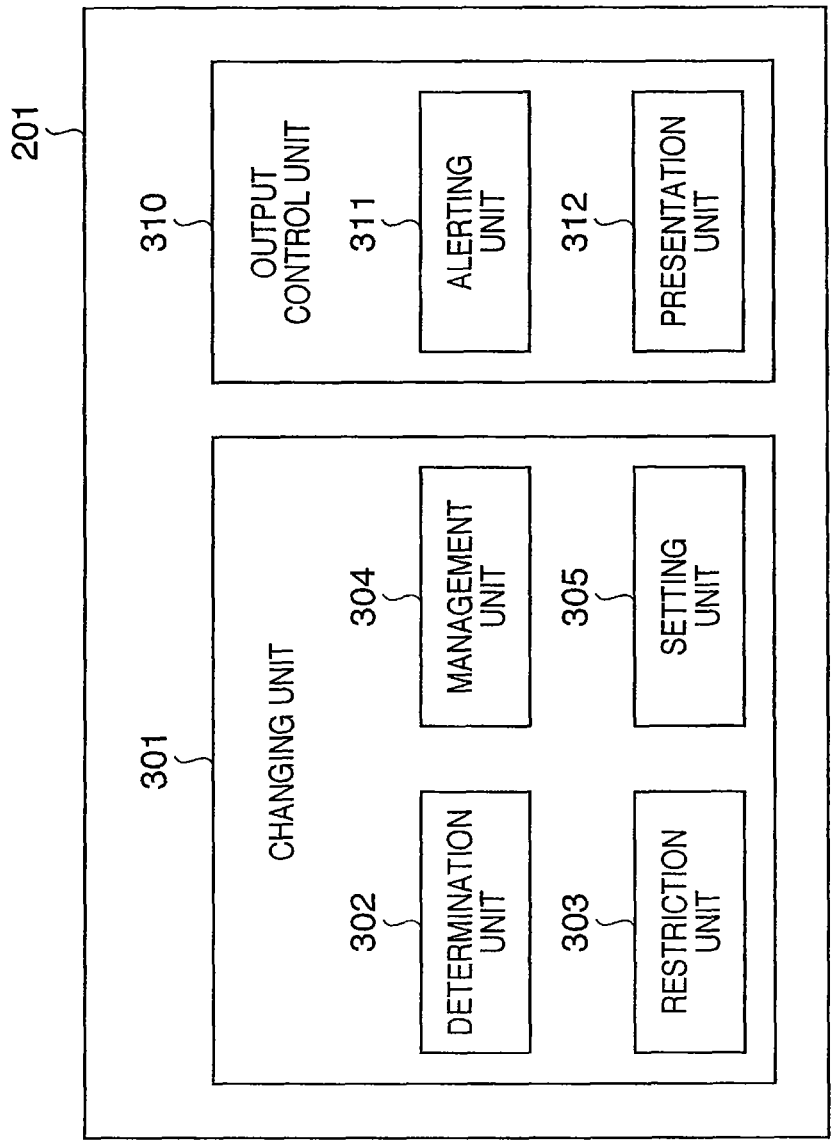
FIG. 3 is a block diagram showing a concrete example of a control unit according to the embodiment.

FIG. 3 is a block diagram showing a concrete example of the control unit according to the embodiment. The control unit 201 implements various functions. A changing unit 301 is a module which changes the contents of control corresponding to a specific one of a plurality of operation units provided for the controlling apparatus in accordance with the measured distance. A determination unit 302 determines whether the measured distance satisfies any of three or more distance conditions. Note that the number of distance conditions may be one or two. A restriction unit 303 restricts the contents of executable control in accordance with the satisfied distance condition.

A management unit 304 manages the contents of executable control for each distance condition with respect to the operation units of the remote controller 106. Note that the management unit 304 generates the management table 207 storing the relationship between distance conditions and the contents of control, and stores the table in the storage unit 205. A setting unit 305 sets the relationship between distance conditions and the contents of control with respect to a specific operation button provided for the remote controller 106 on the basis of an instruction from the user. This allows the user to change the contents of control executed in the digital TV set 102 even when he/she presses the same operation button, in accordance with the distance at the time of operation. It is necessary to customize the relationship between distance conditions and the contents of control for each user, because different users may have rooms with different sizes.

An output control unit 310 is a module which, when the user operates a specific operation button provided for the remote controller 106, causes the output unit 203 of the digital TV set or the output unit of the remote controller to output information concerning the operation result. An alerting unit 311 is a module which outputs an alert to the operator of the remote controller 106. If, for example, a restriction is imposed on the execution of control designated through an operation unit of the controlling apparatus in accordance with distance conditions, the alerting unit 311 outputs a corresponding message. This message may mean that a restriction is imposed on the execution of control. An indication unit 312 indicates a cancel condition required to cancel a restriction on operation with respect to a specific operation button provided for the remote controller 106. That is, the indication unit 312 causes the output unit 203 of the digital TV set or the output unit of the remote controller to output a guidance or setting method for the cancellation of the restriction.

Figure 4:
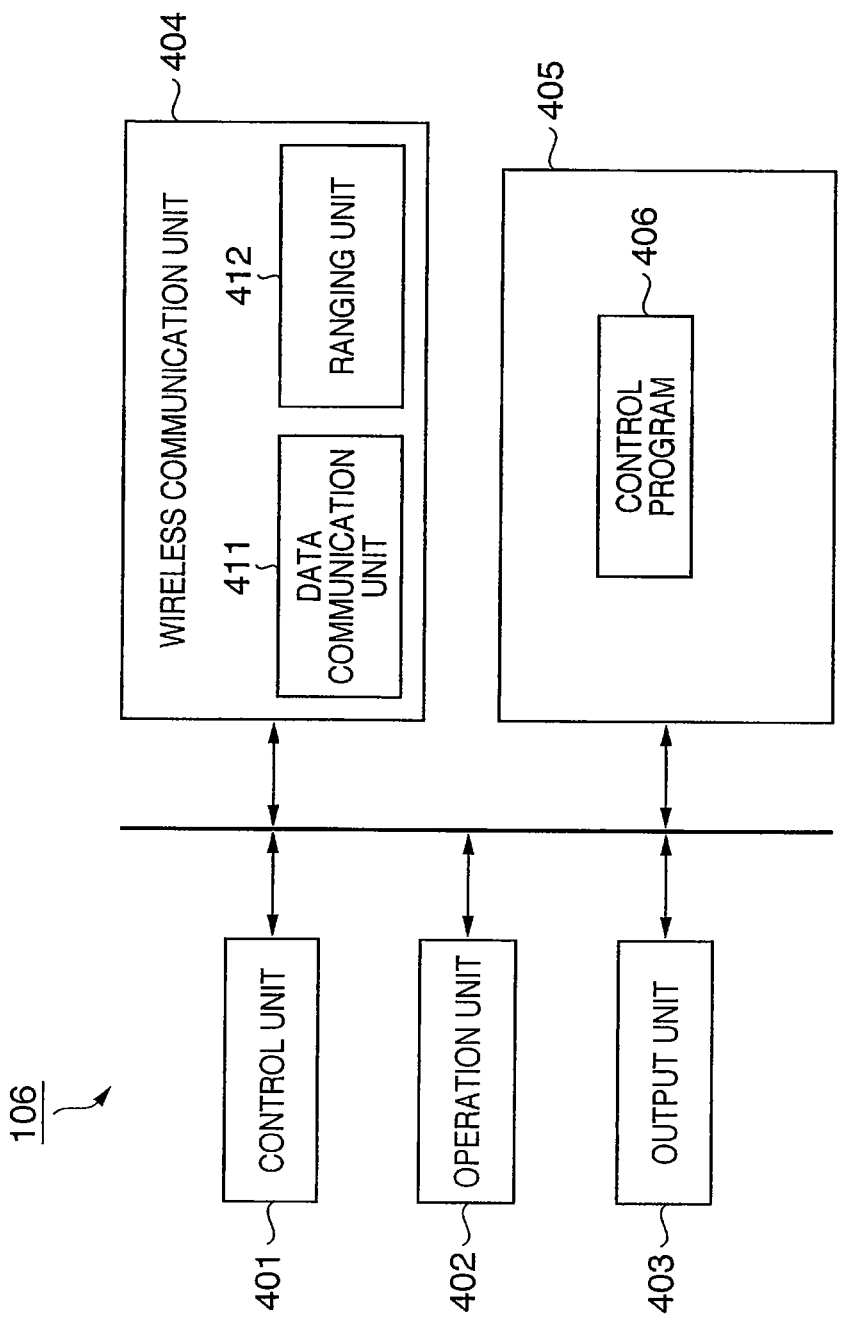
FIG. 4 is an exemplary block diagram of the controlling apparatus according to the embodiment.

FIG. 4 is a block diagram exemplifying the controlling apparatus according to the embodiment. A controlling apparatus like the remote controller 106 comprises the following constituent elements. A control unit 401 is a CPU or MPU which comprehensively controls the respective units included in the remote controller 106. An operation unit 402 is a switch or operation button provided for the remote controller 106.

An output unit 403 is, for example, a liquid crystal display device, voice output device, or the like. A wireless communication unit 404 is a unit for communicating with a controlled apparatus such as the digital TV set 102. Obviously, the wireless communication unit 404 corresponds to the wireless communication unit 204 of the controlled apparatus. The wireless communication unit 404 comprises a data communication unit 411 and a ranging unit 412. The data communication unit 411 transmits an operation instruction (e.g., a command) input through the operation unit 402 to the controlled apparatus, or receives an operation result (control result) corresponding to the operation instruction from the controlled apparatus. The ranging unit 412 is a unit which measures the distance between the controlled apparatus and the controlling apparatus. It suffices if at least one of the controlled apparatus and controlling apparatus comprises a ranging unit. This is because one apparatus can acquire a measurement result acquired by the ranging unit provided for the other apparatus through the data communication unit.

A storage unit 405 is a storage device such as a ROM or a RAM. The storage unit 405 may store a control program 406 for controlling the remote controller.

Figure 5:
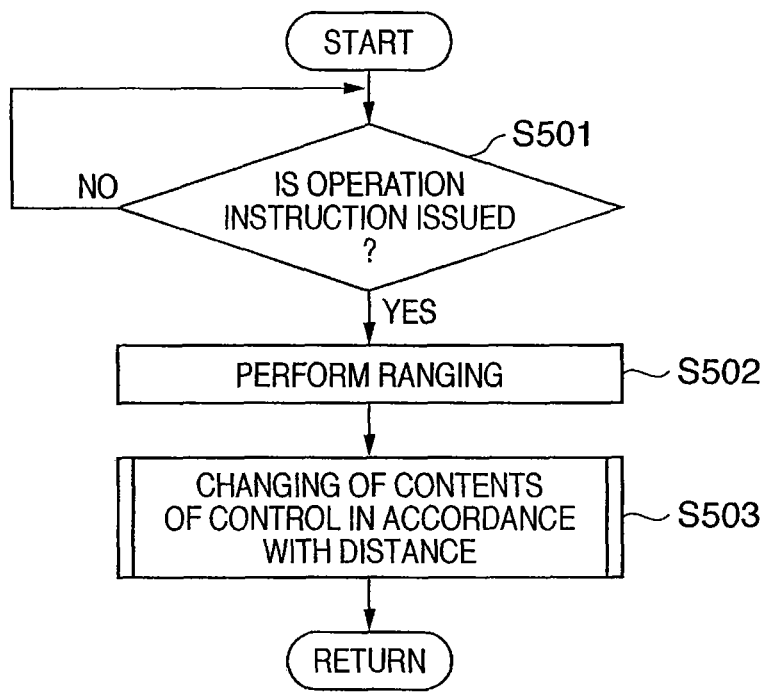
FIG. 5 is a flowchart showing an example of a remote control method executed in the controlled apparatus according to the embodiment.

FIG. 5 is a flowchart showing an example of a remote control method executed in a controlled apparatus according to the embodiment. In step S501, the control unit 201 determines whether the data communication unit 211 has received a control instruction from the remote controller 106. If YES in step S501, the process advances to step S502, in which the control unit 201 instructs the ranging unit 212 to perform ranging. The control unit 201 acquires a ranging result from the ranging unit 212. In step S503, the changing unit 301 of the control unit 201 changes the contents of control to be executed when the user operates a specific one of a plurality of operation buttons provided for the remote controller 106, in accordance with the measured distance.

Figure 6:
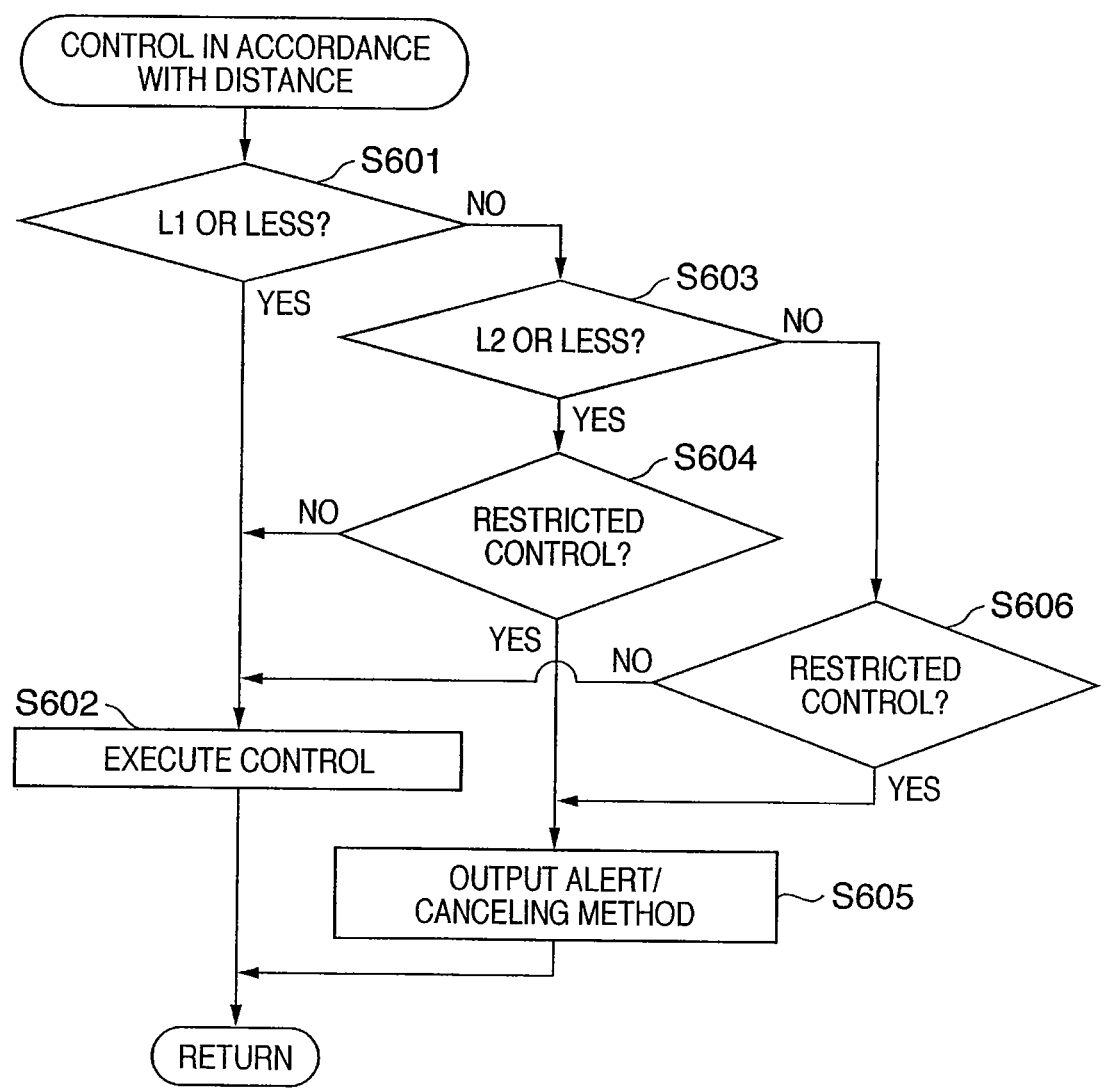
FIG. 6 is a flowchart showing an example of changing processing of the contents of content according to the embodiment.

FIG. 6 is a flowchart showing an example of changing processing for the contents of control according to the embodiment. In this case, the changing processing in step S503 will be described as a subroutine. In step S601, the determination unit 302 of the control unit 201 determines whether the first distance condition (e.g., 0≤distance≤L1) is met.

FIG. 7 is a view showing an example of a management table according to the embodiment. In this example, the first distance condition is 0≤distance≤L1. The first distance condition corresponds to the area 103 exemplified by FIG. 1. The information registered in the management table 207 indicates that if the remote controller 106 exists in the area 103, the user is permitted to change initial setting or a password. In general, the user rarely changes the initial setting, password, or the like which is set once at the time of the installation of the digital TV set. In addition, unintentionally changing them often leads to a disadvantage for the user. Therefore, permitting such operation and control only within the area 103 in which the user generally steps in at a very low probability at the time of viewing makes it possible to reduce the occurrence of such a disadvantage.

The second distance condition is L1<distance≤L2. The second distance condition corresponds to the area 104 exemplified by FIG. 1. The information registered in the management table 207 indicates that if the remote controller 106 exists in the area 104, the user is permitted, for example, to perform image quality adjustment and subscribe to a VOD service. The area 104 is a recommended area for viewing the digital TV set 102, and the most suitable area for image quality adjustment of the digital TV set 102. Using the second distance condition therefore can prevent disadvantages for the user: for example, carelessly changing image quality from a distance at which he/she cannot properly see the screen.

When receiving a VOD service, the user needs to comprehend the contents of the screen in order to select content in accordance with his/her taste. The second distance condition can prevent the user from accidentally performing fee-based operations for a VOD service while he/she cannot see the screen.

The third distance condition is L2<distance. The third distance condition corresponds to the area 105. The information registered in the management table 207 indicates that if the remote controller 106 exists in the area 105, the user is permitted to perform general TV viewing operation, recording, and playback. The area 105 is an area where the wireless communication unit can perform communication, and the user cannot visually recognize the digital TV set 102. The information registered in the management table 207 indicates that in the area 105, the user is permitted to perform operations associated with general TV viewing operation, recording, and playback. This is because it is thought that more importance should be placed on the convenience of permitting the user to perform these operations any time than on the inconvenience of imposing a restriction on the execution of the operations in accordance with distance.

When the first distance condition (less than or equal to L1) is satisfied, the process advances to step S602. In step S602, the control unit 201 executes control corresponding to the content of a received instruction. On the other hand, if the first distance condition is not met, the process advances to step S603. In step S603, the determination unit 302 determines whether the measured distance satisfies the second distance condition (less than or equal to L2). If the measured distance satisfies the second distance condition, the process advances to step S604.

In step S604, the restriction unit 303 refers to the management table to determine whether a restriction is imposed on the contents of control corresponding to the received operation instruction. If NO in step S604, the process advances to step S602, in which the control unit 201 executes control corresponding to the received operation instruction. If a restriction is imposed on the execution of control corresponding to the received operation instruction, the process advances to step S605. In step S605, the alerting unit 311 of the output control unit 310 causes the output unit 203 to output a message indicating that the designated control is restricted. Note that the alerting unit 311 may transmit the message to the remote controller 106 through the data communication unit 211. The remote controller 106 outputs the received message from the output unit 403.

The indication unit 312 may provide guidance for canceling the restriction together with or in place of an alert. The indication unit 312 causes the output unit 203 to output a cancel condition for canceling the restriction (for example, the message "Please move closer to the TV set—to within a distance of L1 or less"). Note that the indication unit 312 may transmit the cancel condition to the remote controller 106 through the data communication unit 211. The remote controller 106 outputs the received cancel condition from the output unit 403.

If it is determined in step S603 that the second distance condition is not met, the process advances to step S606. According to this flowchart and the management table 207, if neither the first or second distance conditions are met, the third distance condition automatically holds. In step S606, the restriction unit 303 refers to the management table to determine whether a restriction is imposed on the execution of the contents of control corresponding to the received operation instruction. If NO in step S606, the process advances to step S602, in which the control unit 201 executes control corresponding to the received operation instruction. If a restriction is imposed on control corresponding the received operation instruction, the process advances to step S605.

[Examples of Alert and Guidance]

Figure 8:
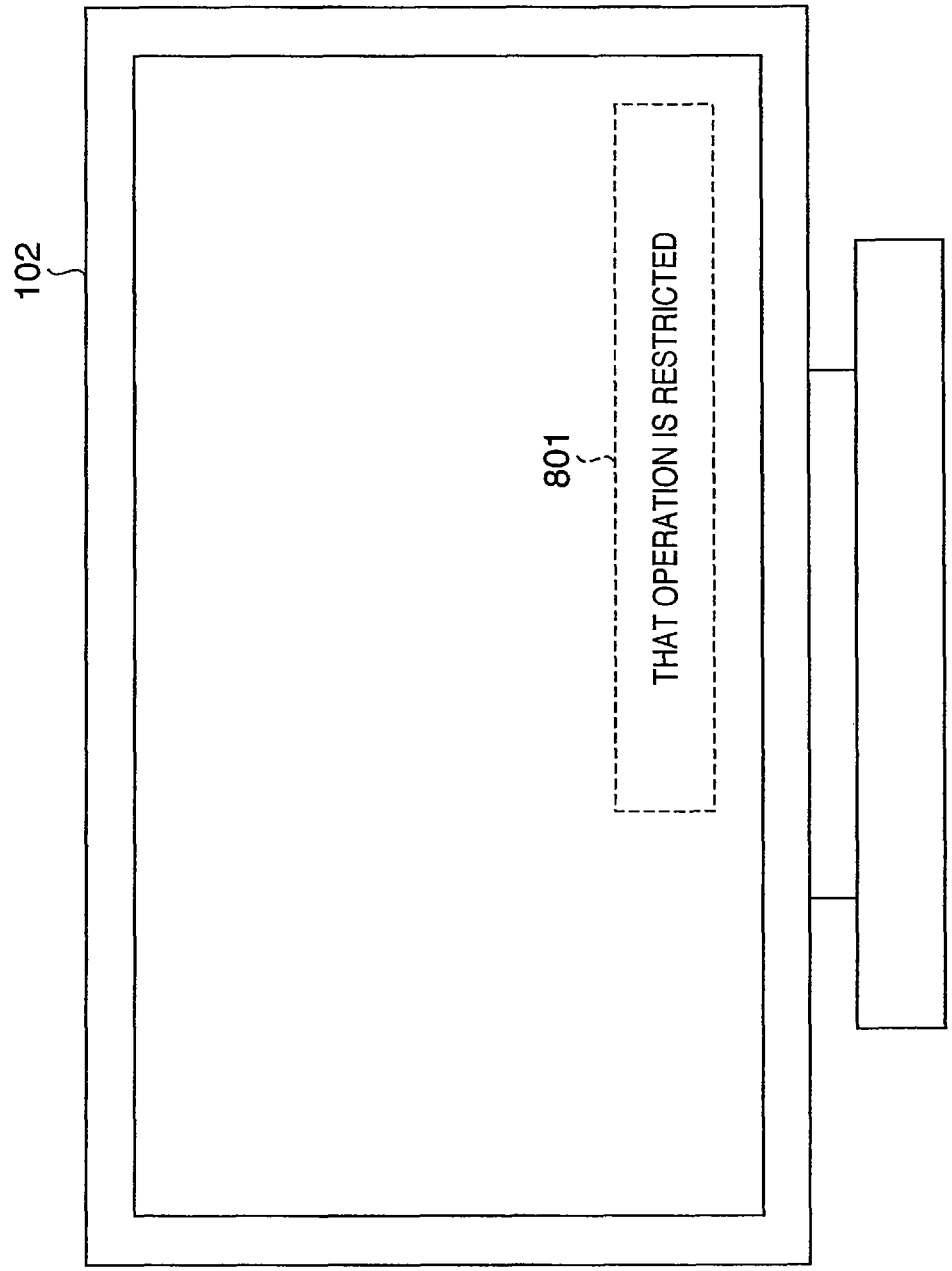
FIG. 8 is a view showing an example of an alert indication when an instruction to execute restricted control is issued.

FIG. 8 is a view showing an example of an alert indication when an instruction to execute restricted control is issued. When the user issues an instruction to execute control on which a restriction has been imposed in advance, it is preferable to explicitly indicate that the operation is restricted. The alerting unit 311 therefore outputs an alert message to the digital TV set 102. The digital TV set 102 displays an alert message 801.

As another unit for alerting the user, this system may use a unit for causing an LED incorporated in the digital TV set 102 to emit light or a unit for generating an alert sound from a speaker. Note that a unit for outputting an alert to the user may be an external device for the digital TV set 102.

Figure 9:
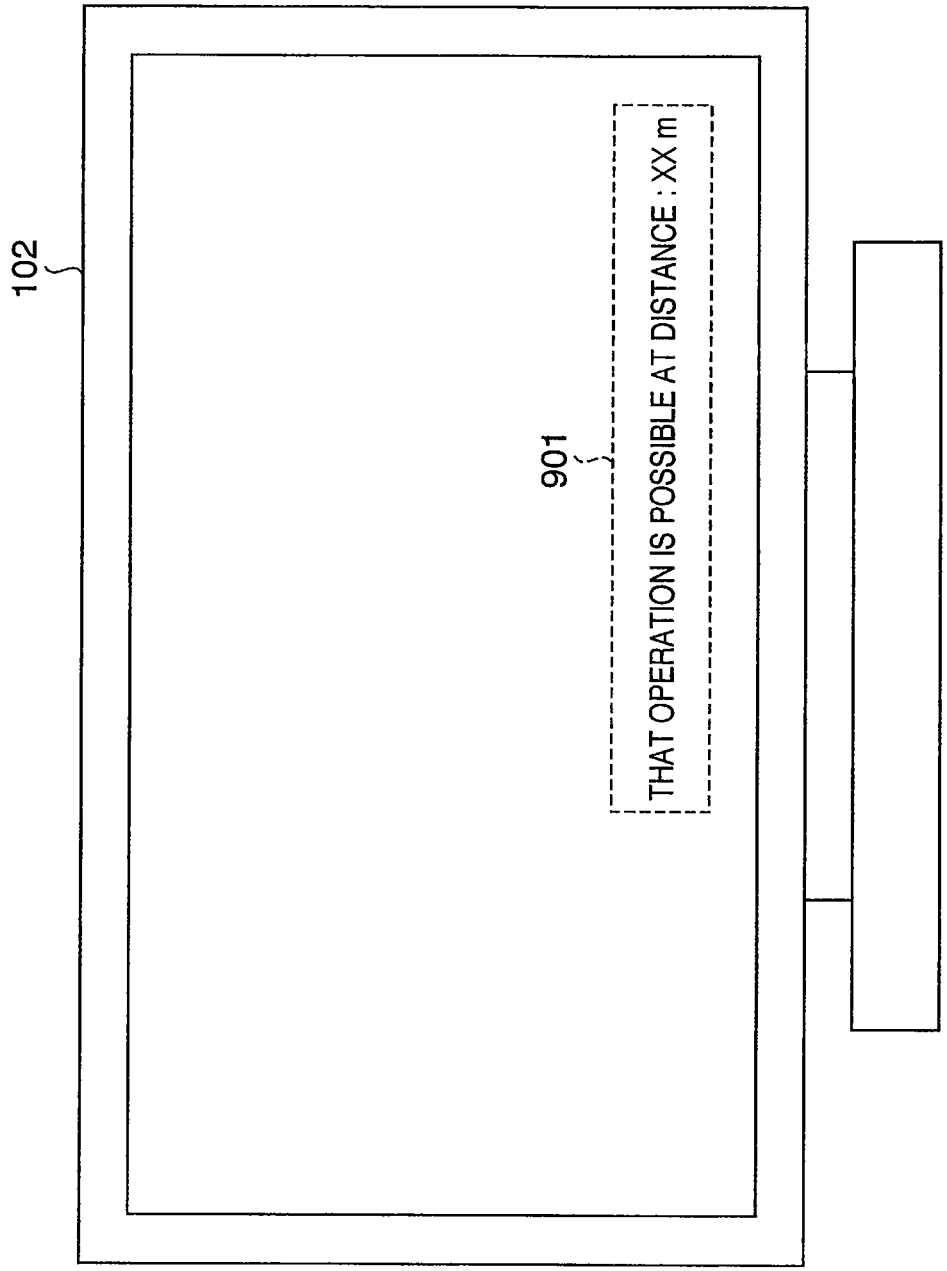
FIG. 9 is a view showing another message example according to the embodiment.

FIG. 9 is a view showing another example of the message according to the embodiment. A message 901 contains information concerning distance that allows execution of a specific control. For example, such a message is displayed if the distance between the remote controller 106 and the TV set falls outside an allowable range at the time when an instruction to execute a specific control is transmitted from the remote controller 106. This operation is performed to output an alert and indicate a condition for canceling the restriction.

The user may not desire to display such a message every time an instruction is issued from the allowable range. In this case, it suffices if the output control unit 310 causes the digital TV set 102 to display the message only when the user presses the operable range display button provided for the remote controller 106.

Figure 10:
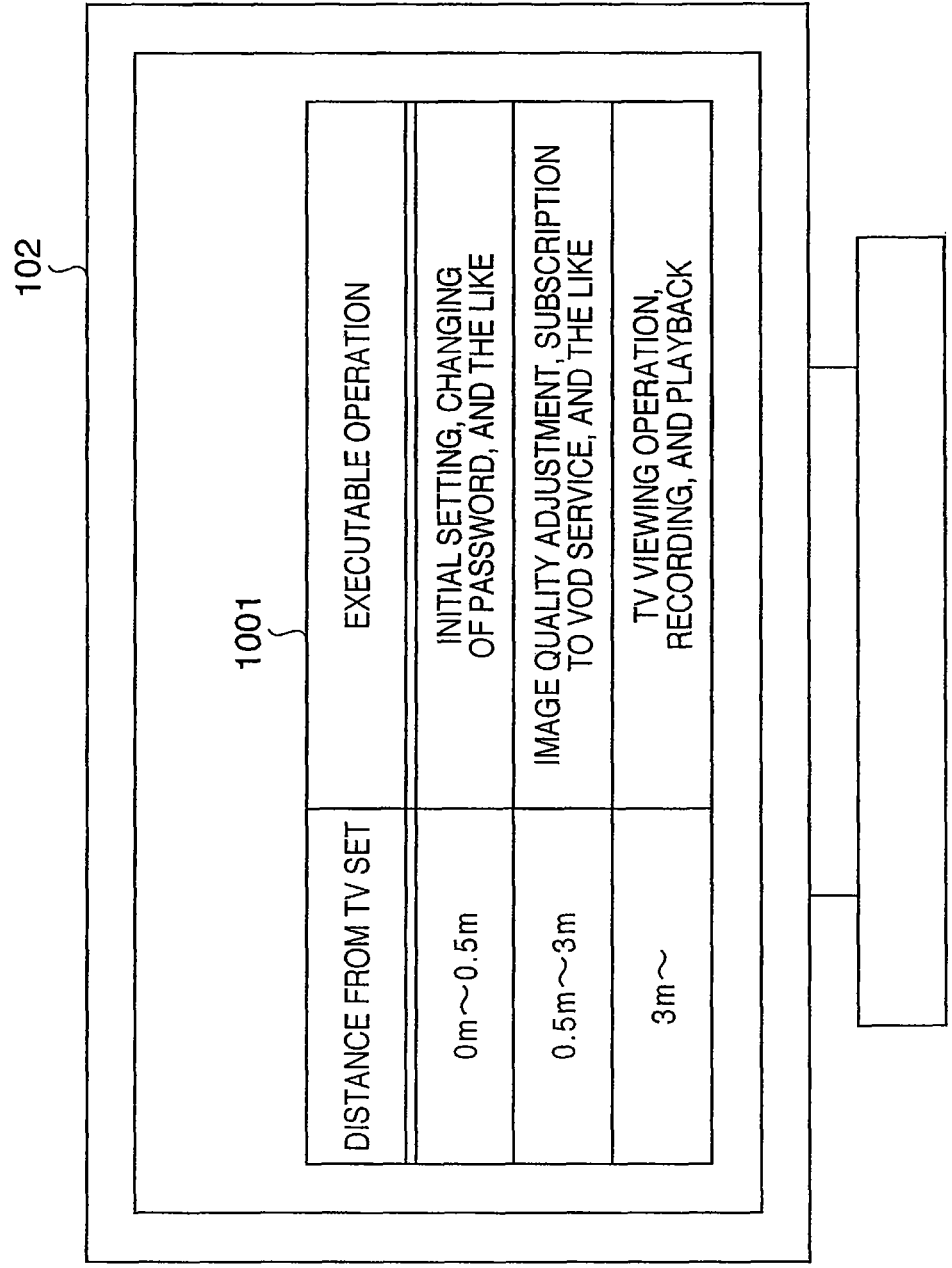
FIG. 10 is a view showing another message example according to the embodiment.

FIG. 10 is a view showing another example of the message according to the embodiment. In this case, this system displays a message 1001 for alerting or guidance as the relationship between distance conditions and the contents of control permitted in the form of a list. This allows the user to grasp the relationship between distance conditions and the contents of control permitted without referring to an instruction manual or the like. As described with reference to FIG. 9, this system may comprise an operable range display button.

This embodiment provides a remote control system which can change the contents of control corresponding to a specific operation unit in accordance with the distance. This improves the convenience for the user more than the prior art.

For example, the control unit 201 restricts the contents of executable control in accordance with one of three or more distance conditions. This makes it possible to assign executable control or operation for each distance.

The management unit 304 may generate the management table 207 for managing the contents of executable control for each distance condition and store it in the storage unit 205.

Providing the setting unit 305, in particular, makes it possible to freely customize the relationship between distance conditions and the contents of control. For example, the setting unit 305 causes the digital TV set 102 to display a setting window like that shown in FIG. 10, and changes the relationship in accordance with operation by the user with the remote controller 106.

In addition, the output control unit 310 may output the execution result of a designated control (e.g., success or failure) to the display unit of the digital TV set 102 or remote controller 106. If a distance condition concerning designated control is not met, in particular, it suffices to output an alert. This allows the user to easily recognize that the distance condition has not been met. Making the indication unit 312 indicate guidance for canceling a restriction allows the user to clearly recognize the condition necessary to cancel restriction.

Second Embodiment

The second embodiment relates to an example of changing the contents of control designated by a specific operation button on a remote controller 106 in accordance with distance. That is, the contents of control to be actually executed differ in accordance with the distance between the remote controller and the TV set even when the user presses the same button. This allows one button to have a plurality of meanings or roles in accordance with the distance, thus providing convenience for the user.

Figure 11:
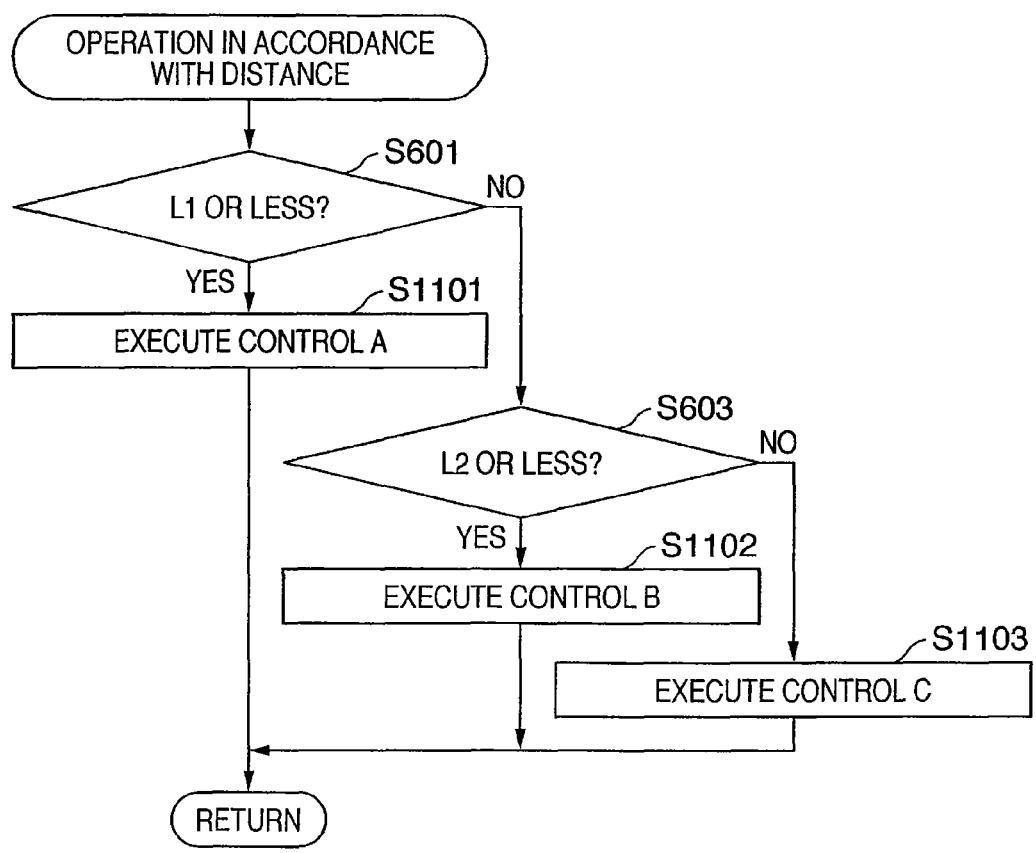
FIG. 11 is a flowchart showing an example of changing processing of the contents of control according to the embodiment.

FIG. 11 is a flowchart showing an example of changing processing for the contents of control according to the embodiment. The changing processing in step S503 will be described as a subroutine. In step S601, a determination unit 302 determines whether the measured distance satisfies the first distance condition (e.g., 0≤distance≤L1). If YES in step S601, the process advances to step S1101, in which a control unit 201 executes control A. Control A has control contents corresponding to the first distance condition. It suffices to manage the relationship between them.

If NO in step S601, the process advances to step S603. In step S603, the determination unit 302 determines whether the second distance condition is met. If YES in step S603, the process advances to step S1102. The control unit 201 executes control B. If the second distance condition also holds, the process advances to step S1103, in which the control unit 201 executes control C. Note that control A, control B, and control C are control operations which differ at least partially from each other.

As described above, this embodiment allows selective use of a specific operation unit for different purposes in accordance with distance. Consider an enlargement/reduction button for a TV screen. For example, when the user presses this button from a place far from the TV set, the enlargement ratio is set to 200%. When the user presses the button from a place close to the TV set, the enlargement ratio is set to 120%. In this case, the merit of this technique is that operating the remote controller at a long distance can greatly enlarge the screen at once, and operating the remote controller at a short distance can gradually enlarge the screen. With regard to the sound volume of the TV set, the embodiment can increase the step size of sound volume when the distance from the TV set is large, and vice versa.

Third Embodiment

According to the embodiments described above, the main part of processing is executed on the controlled apparatus side. However, the present invention is not limited to this. That is, in the third embodiment, most of the above processing is executed on the controlling apparatus side. In this case, a control unit 401 of the controlling apparatus implements each function shown in FIG. 3. In addition, the control unit 401 also executes the processing shown in FIGS. 5, 6, and 11.

In step S501, the control unit 401 determines whether the user has pressed any one of a plurality of buttons provided for an operation unit 402. If YES in step S501, the process advances to step S502, in which the control unit 401 instructs a ranging unit 412 to perform ranging. A control unit 201 receives the ranging result from the ranging unit 412. The control unit 201 may receive the ranging result from a digital TV set 102.

In step S503, a changing unit 301 of the control unit 401 changes the contents of control to be executed when the user operates a specific one of a plurality of operation buttons provided for a remote controller 106, in accordance with the measured distance. In order to make the controlled apparatus execute control determined in accordance with the distance, the control unit 401 transmits a control instruction corresponding to the determined control to the controlled apparatus. According to the first and second embodiments, when the user presses a specific button, the interpretation of the received control instruction is changed in accordance with distance. In contrast, the third embodiment changes the control instruction itself to be transmitted in accordance with distance.

If the distance at the time of operation of a specific operation button does not satisfy any distance condition, an output control unit 310 outputs an alert or a guidance for canceling the restriction from an output unit 403 of the remote controller. Note that the output control unit 310 transmits these messages to the controlled apparatus through the data communication unit 411 to output them from an output unit 203 of the controlled apparatus.

According to this embodiment, making the remote controller 106 central to system operation makes it possible to obtain the same effects as those of the first and second embodiments. Even an existing controlled apparatus may enjoy the advantages of the third embodiment by only replacing it with the remote controller according to this embodiment.

Fourth Embodiment

There are various schemes of implementing the above UWB ranging function. Obviously, for example, this embodiment can use the IR (Impulse Radio)-UWB scheme, DS (Direct Spread)-UWB scheme, MB (Multi-Band)-OFDM-UWB scheme, or the like as the wireless communication units 204 and 404.

The IR-UWB scheme is the simplest method and is designed to use a pulse with a small pulse width (0<pulse width=<1 ns) without using any carrier wave. A pulse having a width of several hundred ps to 1 ns is currently under consideration.

The DS-UWB scheme and the MB-OFDM-UWB scheme are a type of multi-band scheme and are designed to divide a frequency band used by UWB into a plurality of bands and modulate a carrier wave in each band. The DS-UWB scheme uses a direct spread technique. The MB-OFDM-UWB scheme uses a combination of OFDM and frequency hopping.

Figure 12:
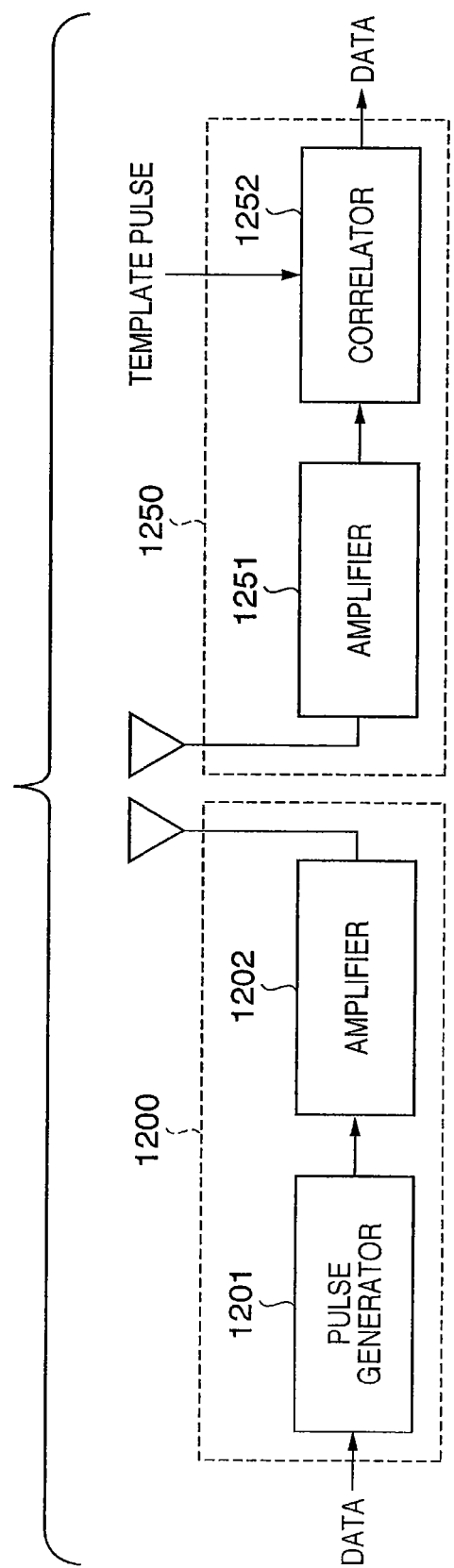
FIG. 12 is a block diagram showing an example of a PHY according to the embodiment.

FIG. 12 is a block diagram showing an example of a wireless communication unit according to this embodiment. A wireless unit based on the IR-UWB scheme will be described here. Wireless communication units 204 and 404 include a transmitting unit 1200 and a receiving unit 1250. In the transmitting unit 1200, a pulse generator 1201 generates a pulse signal corresponding to input data. An amplifier 1202 amplifies the generated pulse signal. In the receiving unit 1250, an amplifier 1251 amplifies a received pulse signal. A correlator 1252 obtains the correlation value between the received pulse signal and a template pulse in order to extract data from the received pulse signal. Since the correlation value is basically 0 or 1, data is determined on the basis of the correlation value.

Note that ranging units 212 and 412 can perform ranging at any timing as long as the wireless communication units 204 and 404 are not used for communicating commands or data. Assume that beacon intervals are inserted every 65 ms in a super frame. In this case, it is preferable to perform ranging by using these beacon intervals, because almost no influence is exerted on data intervals.

The ranging units 212 and 412 measure the time from when the transmitting unit 1200 transmits a UWB pulse for ranging to when the receiving unit 1250 receives the signal reflected by a ranging target. The ranging units 212 and 412 calculate distance by multiplying this time by the propagation speed of a radio wave. Note that this distance is the round trip distance between the electronic apparatus and the ranging target, so a one-way distance is determined by dividing the round-trip distance by 2.

If a ranging target is another wireless communication apparatus, the ranging units 212 and 412 may measure the round-trip time of a signal by receiving the signal returned/transmitted by another wireless communication apparatus. However, the accuracy in ranging with the use of a return signal tends to be lower than with the use of a reflected signal.

When a plurality of wireless communication apparatuses synchronously communicate, the ranging units 212 and 412 can measure the distances from the wireless communication apparatuses on the other party side on the basis of the shift times of arrival of beacons with respect to the synchronization time. If, however, there are synchronization shifts between a plurality of wireless communication apparatuses, this ranging method degrades the ranging accuracy. The method using reflected signals is superior to this method in terms of ranging accuracy. In general, the ranging accuracy required varies depending on the application which uses ranging information. Therefore, it suffices to determine a ranging method in consideration of an application.

Figure 13:
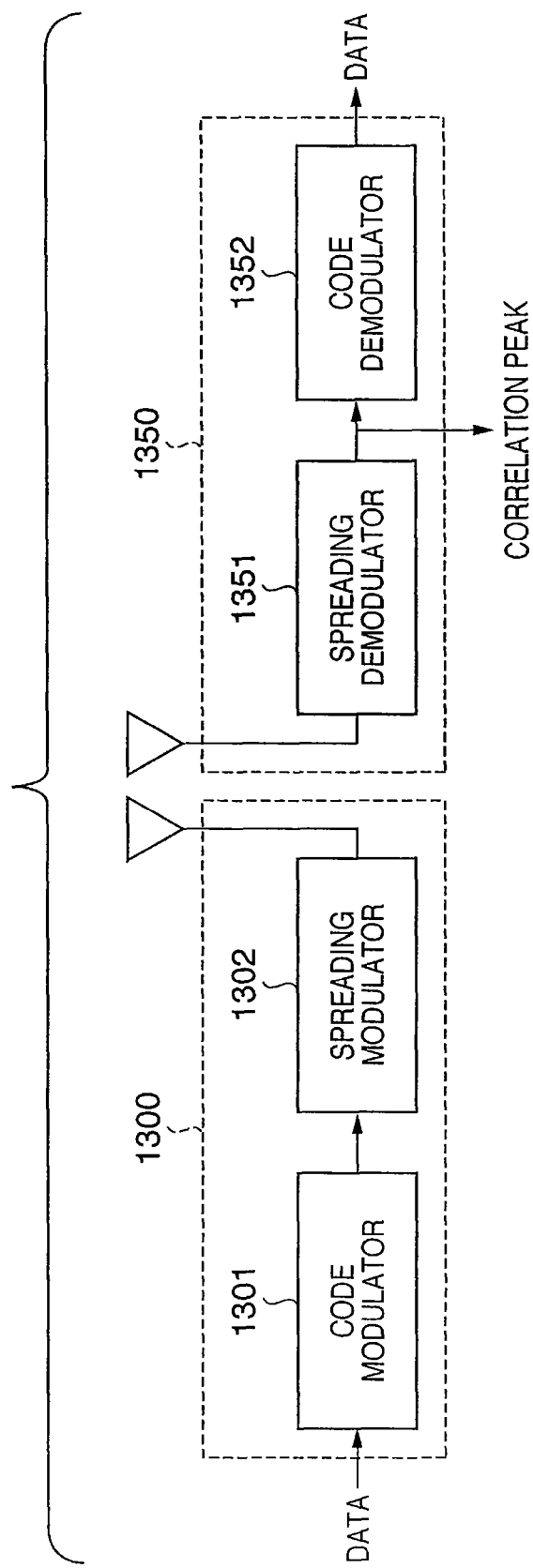
FIG. 13 is a block diagram showing another example of a PHY according to the embodiment.

FIG. 13 is a block diagram showing another example of the PHY according to the embodiment. A wireless unit based on the DS-UWB scheme will be described here. The wireless communication units 204 and 404 include a transmitting unit 1300 and a receiving unit 1350. A code modulator 1301 of the transmitting unit 1300 executes primary modulation such as phase modulation or amplitude modulation for input data. A spreading modulator 1302 executes spreading modulation (secondary modulation) for the primarily modulated signal. On the other hand, a spreading demodulator 1351 on the receiving unit 1350 despreads a received signal. Note that the same spreading code as that used on the transmitting side is used to despread the signal. Performing correlation calculation using such a spreading code will obtain a correlation peak. The ranging units 212 and 412 therefore can perform ranging by using this correlation peak. A code demodulator 1352 extracts data by demodulating the despread signal.

Figure 14:
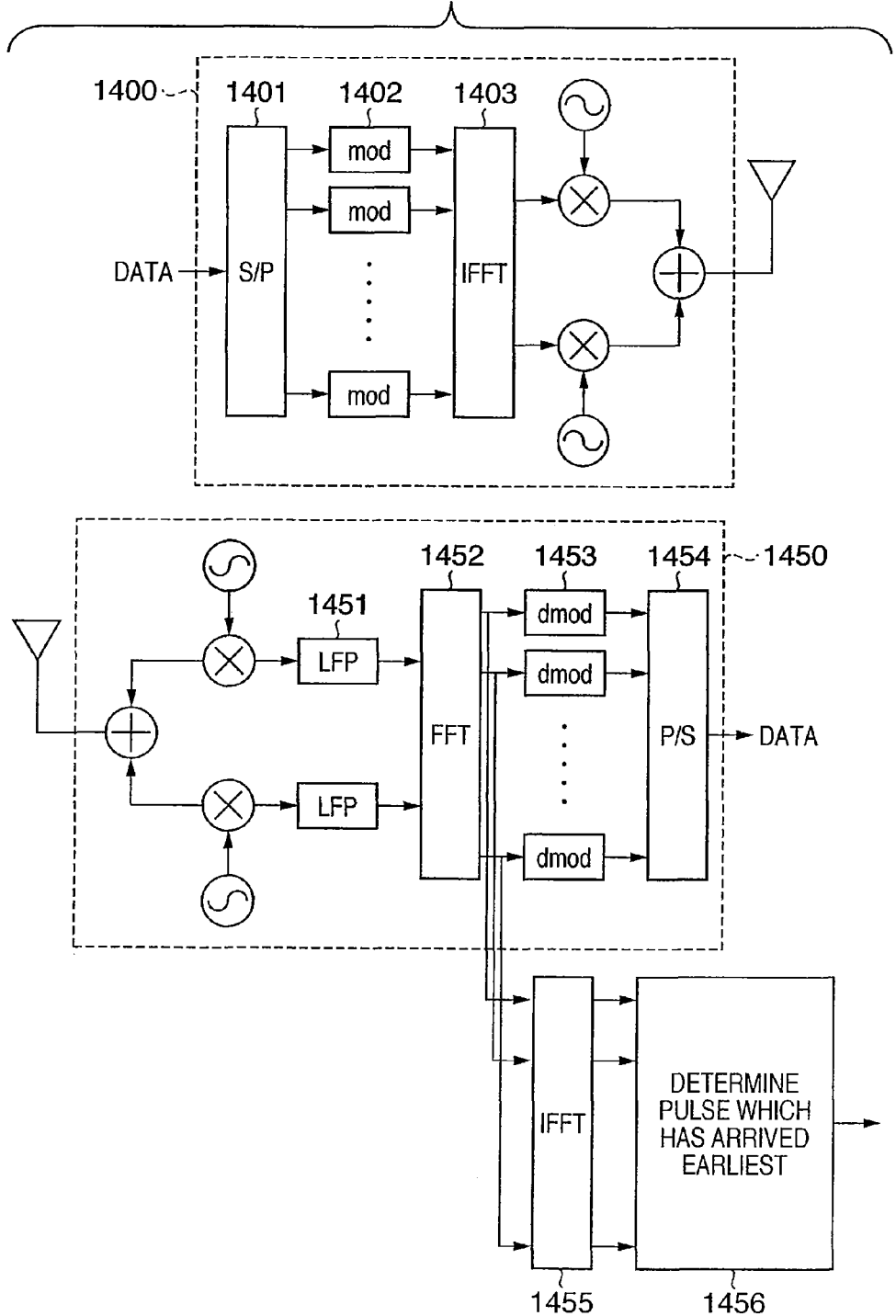
FIG. 14 is a block diagram showing still another example of a PHY according to the embodiment.

FIG. 14 is a block diagram showing another example of the wireless unit according to the embodiment. The wireless communication units 204 and 404 based on the OFDM-UWB scheme will be described here. In a transmitting unit 1400, a serial/parallel converter (S/P) 1401 converts input serial data into parallel data. A plurality of modulators (mod) 1402 execute code modulation of each parallel data. An inverse Fourier transformer 1403 transforms the code-modulated signal (signal on the frequency axis) into a signal on the time axis. A low-pass filter (LPF) 1451 of a receiving unit 1450 extracts a low-frequency component of a received signal. A Fourier transformer 1452 Fourier-transforms the extracted signal into a plurality of signal components on the frequency axis. A plurality of demodulators (dmod) 1453 extract data from the respective signal components by demodulating them. A parallel/serial converter (P/S) 1454 converts parallel data into serial data.

With regard to ranging, an inverse Fourier transformer 1455 extracts a pulse string on the time axis by performing inverse Fourier transform of a signal from the Fourier transformer 1452. A pulse deciding unit 1456 decides which pulse of a plurality of pulse strings has arrived earliest, and outputs only the decided pulse to the ranging units 212 and 412. The ranging units 212 and 412 can perform ranging on the basis of the pulse which has arrived earliest.

Figure 15:
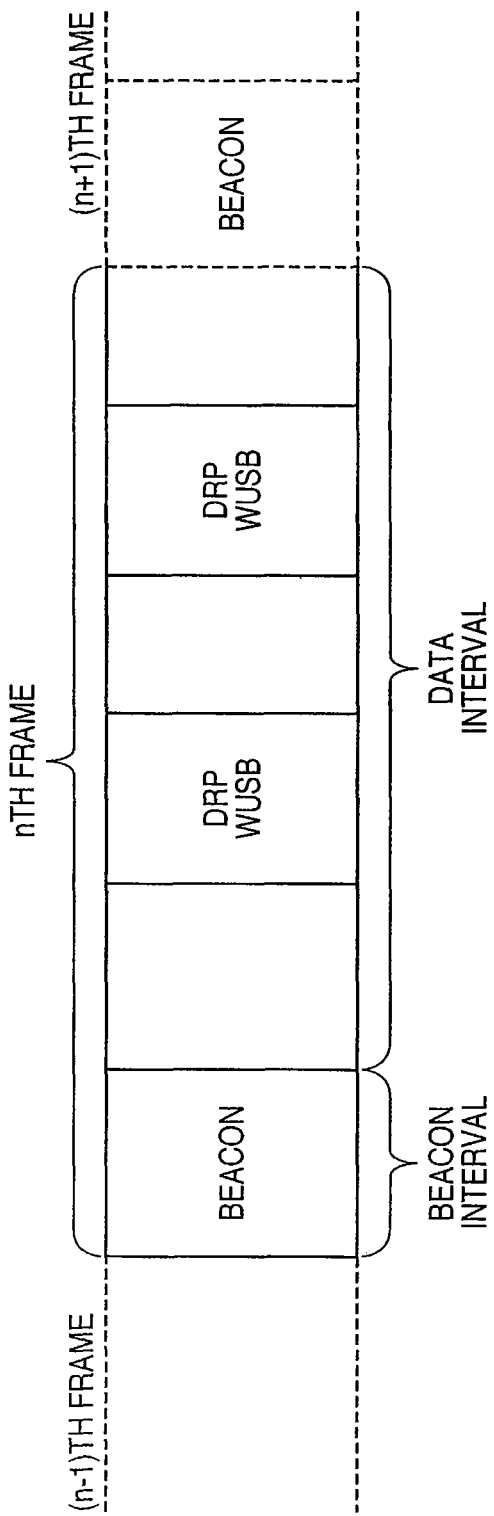
FIG. 15 is a view showing an example of the arrangement of a communication frame according to the embodiment.

FIG. 15 is a view showing an example of the arrangement of a communication frame according to the embodiment. A beacon interval is provided in the head of each frame. A data interval follows the beacon interval. Note that the (n−1)th and (n+1)th frames have the same arrangement as that described above as well as the nth frame. Note also that beacon intervals are provided periodically. That is, a wireless unit periodically (e.g., every 65 ms) transmits beacons. This indicates that frames have a constant length (e.g., 65 ms). Each frame is divided, for example, into 256 media access slots (MASs). Each beacon is used to perform synchronization or reserve an MAS. Note that a DRP (Distributed Reservation Protocol) WUSB provided in a data interval is an MAS for wireless USB data.

Figure 16:
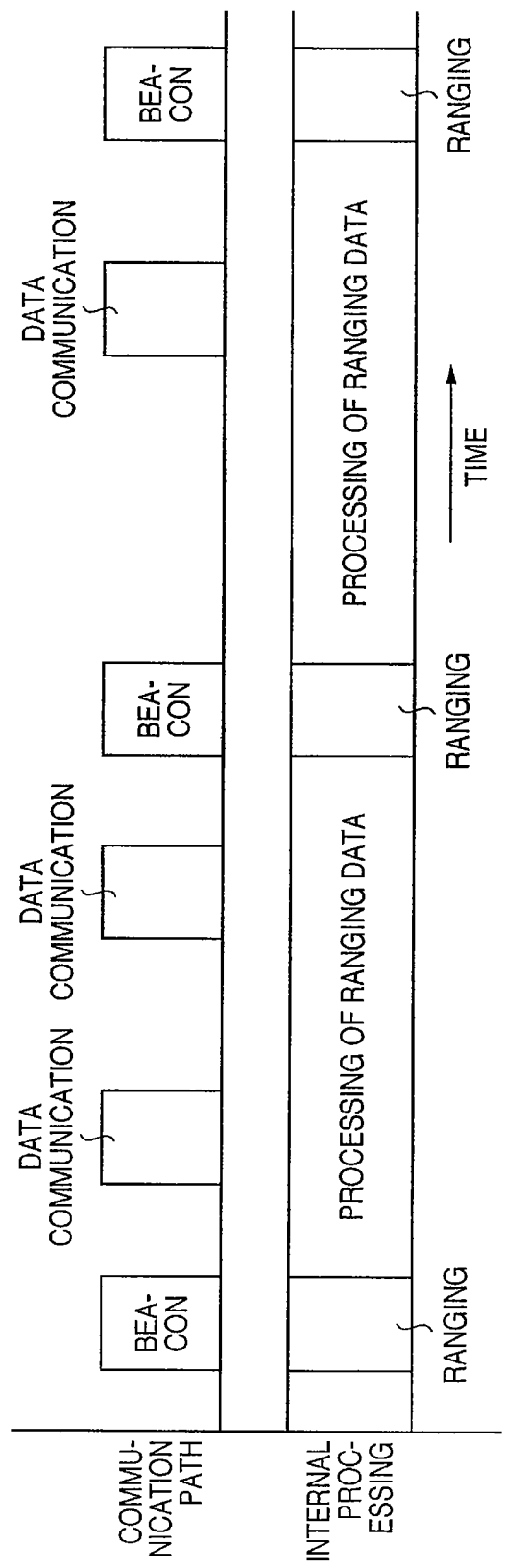
FIG. 16 is a view showing the temporal relationship between the usage state of a communication path and internal processing in a wireless communication apparatus according to the embodiment.

FIG. 16 is a view showing the temporal relationship between the usage state of a communication path and internal processing in a wireless communication apparatus according to the embodiment. As shown in FIG. 16, the ranging units 212 and 412 cause the wireless units to transmit beacons in beacon intervals and receive the reflected beacons. The ranging units 212 and 412 then may determine distance on the basis of signals obtained from the wireless units. For example, when performing ranging in the nth frame, the ranging units 212 and 412 may finish determining distance until the timing of the transmission of the next (n+1)th beacon.

As described above, if the ranging units 212 and 412 can complete ranging within one frame period, they can execute ranging for each frame. That is, the wireless communication unit periodically transmits beacons, and hence can periodically execute ranging.

In addition, the ranging units 212 and 412 can measure the relative speed of a ranging target from the temporal variation amount of distance determined on the basis of periodically transmitted beacons. For example, the ranging units 212 and 412 can calculate a moving speed by dividing the difference between the distance detected in the nth frame and the distance detected in the (n+1)th frame by a frame period (e.g., 65 ms). Obviously, this moving speed corresponds to the relative speed between the wireless communication apparatus and the ranging target.

As described above, using the wireless communication units 204 and 404 complying with the UWB specifications makes it possible to perform ranging concurrently with data communication. That is, any electronic device using the UWB specifications can alert the user of the approach of an object even while the user is browsing content using data communication.

Other Embodiments

The above ranging unit can also detect a moving object from a change in the distance to the object. For example, when the user shakes the remote controller, the ranging unit can specify the direction of the remote controller with respect to a controlled apparatus, thereby recognizing the ranging target. This helps to improve the ranging accuracy.

The above embodiment has exemplified a digital TV set as a controlled apparatus. However, the present invention is not limited to this, and can also be applied to other home electric appliances such as audiovisual apparatuses.

In addition, the control unit 201 may change the size and amount of characters to be displayed on the digital TV set in accordance with distance. If, for example, the distance is large, the control unit 201 uses a font with a size larger than a normal size for character display. If the distance is small, the control unit 201 uses a font with a size smaller than the normal size for character display.

The above embodiment is based on the assumption that the UWB specifications are used for the wireless communication unit. The present invention can use other specifications. That is, other wireless communication specifications such as infrared communication specifications and Bluetooth specifications can be used for the wireless communication unit. In this case, the data communication unit and the ranging unit may use the same specifications or different specifications.

The execution order of the respective steps in the above flowcharts can be interchanged to the extent that there is no contradiction to the present invention. For example, it suffices to execute ranging before the user presses an operation button. In this case, the control unit reads out the information regarding the distance, which has already been measured from the storage unit, when the user presses an operation button.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-165362, Jun. 14, 2006, which is hereby incorporated by reference herein in its entirety.

What is claimed is:

1. A remote control system, including a controlled apparatus and a controlling apparatus, which remotely controls functions of the controlled apparatus, the system comprising:

a measuring unit which measures a distance between the controlled apparatus and the controlling apparatus;

a changing unit which changes, when a specific one of a plurality of operation units provided for the controlling apparatus is operated, a parameter of the controlled apparatus corresponding to the specific one of the plurality of operation units; and an adjusting unit which adjusts a change amount of the parameter to be changed by the changing unit per one user operation to the specific one of the plurality of operation units when the specific one of the plurality of operation units provided for the controlling apparatus is operated, based on the measured distance, wherein the adjusting unit adjusts the change amount smaller as the measured distance is shorter.

2. The system according to claim 1, further including a determination unit which determines whether the measured distance satisfies any one of not less than three distance conditions, wherein the adjusting unit adjusts the change amount based on a distance condition which is determined by the determination unit that the measured distance.

3. The system according to claim 2, wherein the adjusting unit differentiates the change amount by each of the distance conditions.

4. The system according to claim 1, further including a sound output unit provided for the controlled apparatus which outputs sound,
wherein the adjusting unit adjusts the change amount for changing volume of the sound outputted from the sound output unit, the volume of the sound being one of parameters of the controlled apparatus, and
the changing unit changes the volume of the sound based on the change amount adjusted by the adjusting unit.

5. The system according to claim 1, further including a video output unit provided to the controlled apparatus which outputs video,
wherein the adjusting unit adjusts the change amount of an enlargement ratio of the video, the enlargement ratio is one of parameters of the controlled apparatus, and
the changing unit changes the enlargement ratio based on the change amount adjusted by the adjusting unit.

6. A controlled apparatus of which functions are remotely controlled by a controlling apparatus, the apparatus comprising:
an acquisition unit which acquires information concerning a distance between the controlled apparatus and the controlling apparatus;
a changing unit which changes, when a specific one of a plurality of operation units provided for the controlling apparatus is operated, a parameter of the controlled apparatus corresponding to the specific one of the plurality of operation units; and
an adjusting unit which adjusts a change amount of the parameter to be changed by the changing unit per one user operation to the specific one of the plurality of operation units when the specific one of the plurality of operation units provided for the controlling apparatus is operated, based on the information concerning the distance,
wherein the adjusting unit adjusts the change amount smaller as the measured distance is shorter.

7. The controlled apparatus according to claim 6, further including a determination unit which determines whether the measured distance satisfies any one of not less than three distance conditions, and
wherein the adjusting unit adjusts the change amount based on a distance condition which is determined by the determination unit that the measured distance satisfies.

8. The controlled apparatus according to claim 7, wherein the adjusting unit differentiates the change amount by each of the distance conditions.

9. The controlled apparatus according to claim 6, further including a sound output unit provided for the controlled apparatus which outputs sound,
wherein the adjusting unit adjusts the change amount for changing volume of the sound outputted from the sound output unit, the volume of the sound being one of parameters of the controlled apparatus, and
the changing unit changes the volume of the sound based on the change amount adjusted by the adjusting unit.

10. The controlled apparatus according to claim 6, further including a video output unit provided to the controlled apparatus which outputs video,
wherein the adjusting unit adjusts the change amount of an enlargement ratio of the video, the enlargement ratio is one of parameters of the controlled apparatus, and
the changing unit changes the enlargement ratio based on the change amount adjusted by the adjusting unit.

11. A remote control method which remotely controls functions of a controlled apparatus by using a controlling apparatus, the method comprising:
an acquisition step of acquiring information concerning a distance between the controlled apparatus and the controlling apparatus;
a changing step of changing, when a specific one of a plurality of operation units provided for the controlling apparatus is operated, a parameter of the controlled apparatus corresponding to the specific one of the plurality of operation units; and
an adjusting step of adjusting a change amount of the parameter to be changed by the changing step per one user operation to the specific one of the plurality of operation units when the specific one of the plurality of operation units provided for the controlling apparatus is operated, based on the information concerning the distance,
wherein the adjusting step includes adjusting the change amount smaller as the measured distance is shorter.

12. A non-transitory computer-readable storage medium storing computer-executable instructions, the computer-executable instructions causing a computer to execute the method according to claim 11.

* * * * *